United States Patent [19]
Darceot

[11] Patent Number: 5,934,600
[45] Date of Patent: Aug. 10, 1999

[54] METHOD OF MANUFACTURING DIRECT-CURRENT ELECTRIC MOTOR

[75] Inventor: Michel Darceot, Herimoncourt, France

[73] Assignee: ECIA - Equipements et Composants Pour L'Industrie Automobile, Audincourt, France

[21] Appl. No.: 08/850,221

[22] Filed: May 1, 1997

Related U.S. Application Data

[62] Division of application No. 08/707,514, Sep. 4, 1996, Pat. No. 5,661,355.

[30] Foreign Application Priority Data

Sep. 4, 1995 [FR] France .................................. 95 10 351

[51] Int. Cl.⁶ ...................................................... H02K 3/28
[52] U.S. Cl. ............................................ 242/433; 310/180
[58] Field of Search ............................ 242/433.3, 433.2; 310/179, 180, 184, 185, 191, 195, 198, 206, 207, 208, 214, 254, 261

[56] References Cited

U.S. PATENT DOCUMENTS

| | | |
|---|---|---|
| 2,999,953 | 12/1961 | Levy . |
| 3,325,661 | 6/1967 | Parsons . |
| 3,584,273 | 6/1971 | Massar . |
| 3,979,618 | 9/1976 | Auinger .................................. 310/198 |
| 4,227,107 | 10/1980 | Ban et al. . |
| 4,348,606 | 9/1982 | Hibino . |
| 4,386,291 | 5/1983 | Herr . |
| 4,492,890 | 1/1985 | MacDonald . |
| 4,577,139 | 3/1986 | Reinhardt et al. . |
| 5,231,324 | 7/1993 | Kawamura et al. . |
| 5,267,699 | 12/1993 | Lombardi .............................. 242/433.3 |
| 5,661,355 | 8/1997 | Darceot .................................... 310/180 |

FOREIGN PATENT DOCUMENTS

| | | |
|---|---|---|
| 4403302 | 8/1995 | Germany . |
| 813593 | 3/1981 | U.S.S.R. . |
| 1053224 | 11/1983 | U.S.S.R. . |
| 1262634 | 10/1986 | U.S.S.R. . |
| 1624606 | 1/1991 | U.S.S.R. . |

Primary Examiner—Katherine A. Matecki
Attorney, Agent, or Firm—Sughrue, Mion, Zinn, Macpeak & Seas, PLLC

[57] ABSTRACT

This motor includes an armature winding (12) equipped with conducting coils (A1 to A4, B1 to B4, C1 to C4) distributed into three phases and into two, lower and upper, layers. The lower coils (A1, A3, C1, C3, B2, B4) alternate with the upper coils (B1, B3, A2, A4, C2, C4). Each phase comprises a pair of diametrally opposed coils arranged in the lower layer and a pair of diametrally opposed coils arranged in the upper layer. These two pairs are linked electrically in parallel. Each coil includes two, lower (A11) and upper (A12), windings and two uninterrupted wound conductors (K1, K2) . linked electrically in parallel. Each conductor (K1, K2) forms the lower winding of a coil of a pair and the upper winding of the other coil of this pair, in such a way that these lower and upper windings are linked electrically in series.

1 Claim, 8 Drawing Sheets

METHOD OF MANUFACTURING DIRECT-CURRENT ELECTRIC MOTOR

This is a divisional of application Ser. No. 08/707,514, filed Sept. 4, 1996, now U.S. Pat. No. 5,661,355.

BACKGROUND OF THE INVENTION

The present invention relates to a direct-current electric motor and a method of manufacturing this motor.

It applies in particular to electronic-commutation electric motors used particularly in electric fan units equipping motor vehicles.

A direct-current electric motor is already known in the state of the art, of the type including an armature winding with an armature of generally cylindrical shape carrying conducting coils distributed into three phases and into at least two layers, the coils of the same phase being supplied with electricity simultaneously, each phase including at least two pairs of diametrally opposed coils.

The armature winding is, for example, of the three-phase square type including twelve coils distributed into the three phases, the coils of one phase being supplied with electricity simultaneously. Each phase includes two pairs of diametrally opposed coils. Each pair of coils of one phase is arranged at a right angle with respect to the other pair of coils of this phase.

In a conventional way, the coils are wound on the armature winding by distributing them into three successive layers corresponding to the three phases of the armature winding.

The winding of the armature is carried out by means of a winder including an arm intended to wind the conductors forming the coils on the armature. The arm successively winds the four coils of the lower layer (first phase), then the four coils of the intermediate layer (second phase) and finally the four coils of the upper layer (third phase). The four coils of the same phase are linked electrically in series. The coils of the different phases are spaced by 30° from each other.

Because the different phases of the armature winding correspond to superimposed layers of coils, the lengths of the conductors constituting the phases are different. This results in different phase resistances and electrical imbalance which is particularly troublesome when the power supply to and the commutation of the phases is carried out by an electronic circuit.

SUMMARY OF THE INVENTION

The object of the invention is, in particular, to remedy this electrical phase imbalance.

To this end, the subject of the invention is a direct-current electric motor, of the abovementioned type, characterized in that the coils are distributed into two, lower and upper, layers, the lower coils alternating with the upper coils, each phase comprising a pair of diametrally opposed coils arranged in the lower layer and a pair of diametrally opposed coils arranged in the upper layer, these two pairs being linked electrically in parallel, each coil including two, lower and upper, windings and two uninterrupted wound conductors linked electrically in parallel, each conductor forming the lower winding of a coil of a pair and the upper winding of the other coil of this pair, in such a way that these lower and upper windings are linked electrically in series, and that each pair of coils comprises a coil for current entry into the pair and a coil for current exit from this pair.

According to other characteristics of this motor:

the armature winding is fixed, and the motor additionally includes a support carrying an electronic circuit for supplying power to and commutating the coils, and an electrical connection element of generally cylindrical shape, coaxial with the armature, comprising a conducting ring divided into electrically isolated sectors, this ring including a first face equipped with means for fastening to the armature, a second face equipped with conducting pins for connection with the electronic circuit, and conducting peripheral hooks for connecting the coils with the ring, the number of connecting pins being equal to the number of isolated sectors and the number of connecting hooks being equal to the number of coils of the armature winding, the ring includes one current entry sector per phase, onto which are linked the ends of the conductors forming the current entries for the pairs of coils of this phase, and an exit sector, onto which are linked all the ends of the conductors forming the current exits of all the pairs of coils, the armature winding includes twelve coils distributed into the three phases, the diametrally opposed pairs of coils of the same phase being arranged at a right angle with respect to one another, the connecting hooks being distributed in terms of angle in line with the coils, the current entry (or exit respectively) of the lower pair of coils of a phase being linked to a current entry hook (or exit hook respectively) offset by 60° with respect to the current entry coil (or exit coil respectively) of this pair, and the entry (or exit respectively) of the upper pair of coils of one phase being linked to a current entry hook (or exit hook respectively) arranged in line with the current entry coil (or exit coil respectively) of this pair, in such a way that the two current entry hooks linked to the two pairs of coils of one phase are juxtaposed and belong to the same current entry sector and that all the current exit hooks are juxtaposed and belong to the exit sector.

A further subject of the invention is a method of manufacturing a direct-current electric motor as previously defined, characterized in that each pair of diametrally opposed coils is formed by means of a two-armed winder, these two arms, in the course of a first stage, simultaneously producing the two lower windings of the coils, then, in the course of a second stage, after rotation of the armature by a half-turn about its axis, the upper windings of the coils, the two corresponding conductors being wound by the two arms of the winder in the course of these two stages in directions which are symmetric with respect to a diametral plane of the armature perpendicular to the alignment of the coils of the pair.

The invention will be better understood on reading the description which will follow, given solely by way of example and by referring to the attached drawings in which:

DESCRIPTION OF PREFERRED EMBODIMENTS

Figure 1:
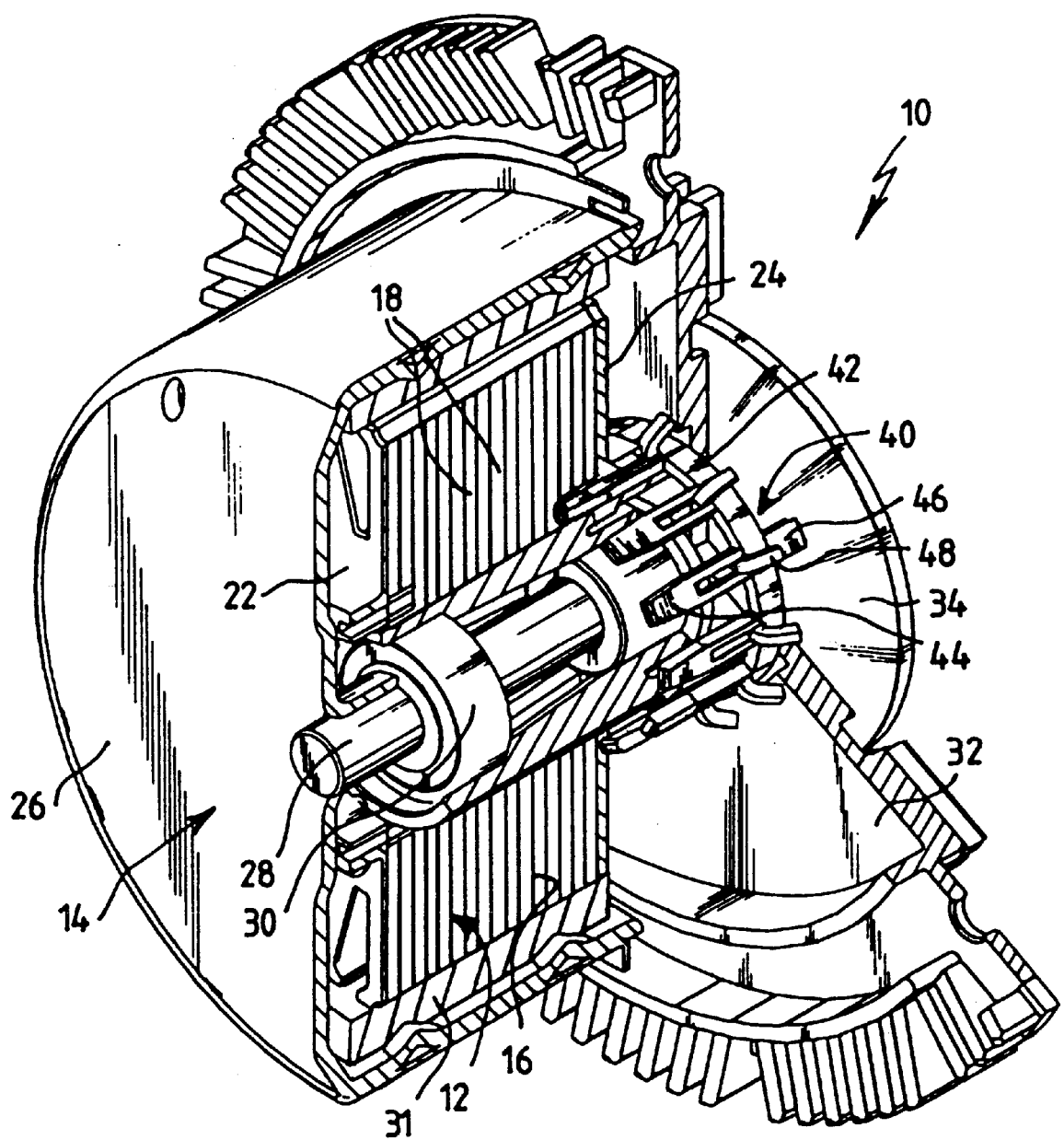
FIG. 1 is a perspective view in axial section of an electric motor according to the invention.

A direct-current electric motor according to the invention, designated by the overall reference 10, has been represented in FIG. 1.

This motor 10 includes a fixed armature winding 12 and a rotary field system 14. For reasons of clarity, the conducting coils of the armature winding 12 have not been represented in FIGS. 1 and 2.

The armature winding is of the three-phase square type and will be described later.

Figure 2:
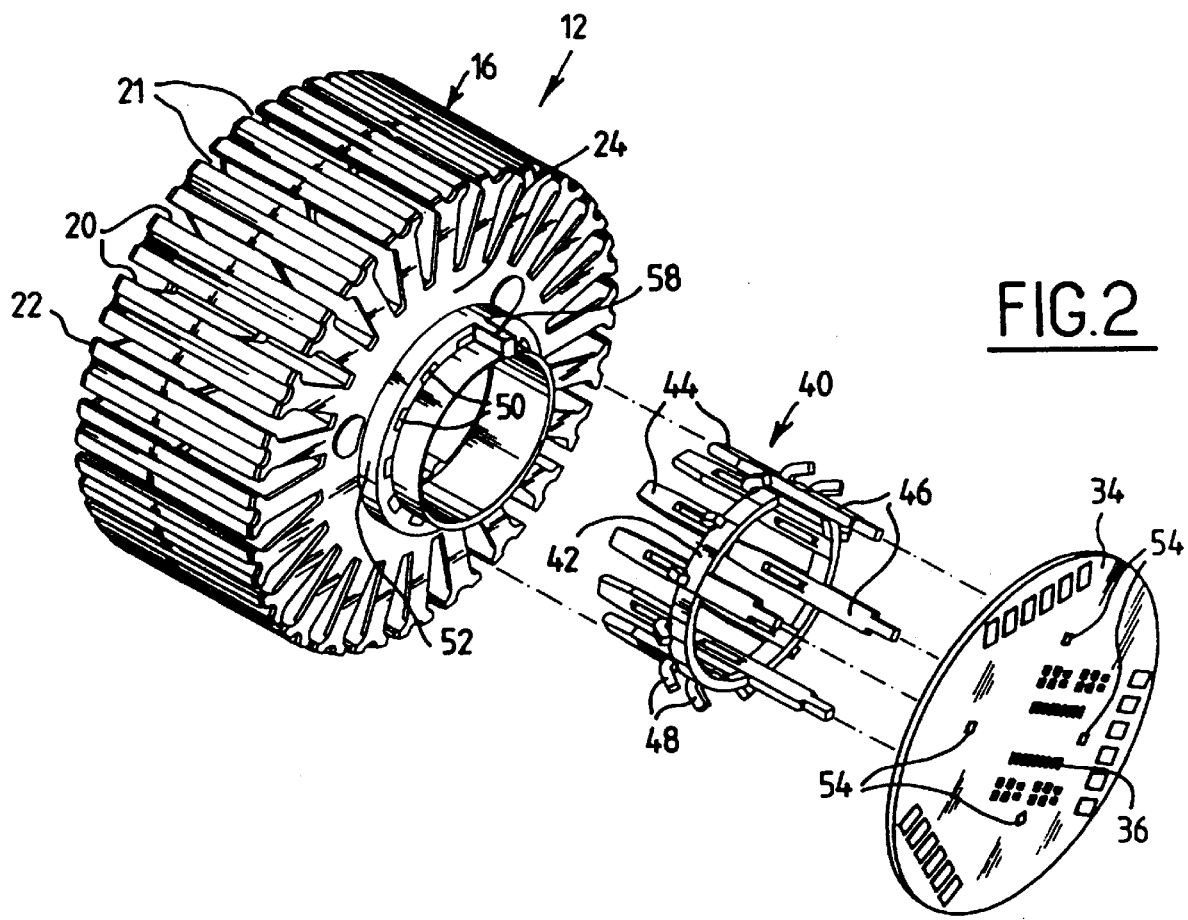
FIG. 2 is an exploded perspective view of certain elements of the motor represented in FIG. 1.

The armature winding 12 includes an armature 16 of generally cylindrical shape comprising, conventionally, a stack of laminations 18 delimiting slots 20 for fixing the coils, which are clearly represented in FIG. 2. The slots 20 are separated by teeth 21.

The armature 16 also includes electrical insulation cheeks 22, 24 covering these faces.

The field system 14 includes a bowl-shaped rotary armature 26 in which the armature winding 12 is housed.

The field system armature 26 is linked in a way which is known per se to a rotary shaft 28 carried by bearing means 30 interposed between this shaft 28 and the armature winding 16.

Permanent magnets 31 are fastened in a way known per se to the inner contour of the field system armature 26.

The open side of the field system armature 26 is closed off by a fixed flange 32 carrying a plate 34 forming a support for an electronic circuit 36 for supplying power to and commutating the coils of the armature winding 12.

Figure 3:
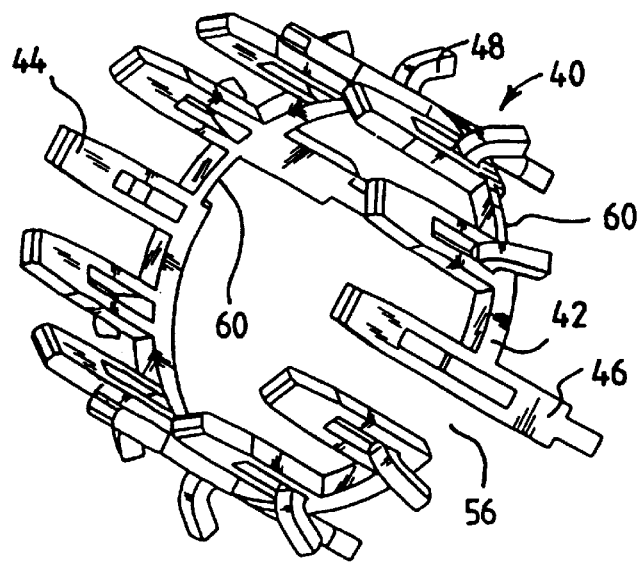
FIG. 3 is a perspective view, on an enlarged scale, of an element for electrical connection of the motor according to the invention.

The electronic circuit 36 is connected electrically to the coils of the armature winding 12 by an element 40 of generally cylindrical shape which is shown in detail in FIGS. 2 and 3. The element 40 is coaxial with the armature 16.

The electrical connection element 40 comprises a conducting ring 42 including a first face equipped with at least two axial spigots 44 for fastening onto the armature 16 and a second face equipped with at least two conducting axial pins 46 for connecting with the commutation circuit 36.

The conducting ring 42 also includes at least two conducting peripheral hooks 48 for connecting the coils of the armature winding with this ring.

For preference, the fastening spigots 44, the pins 46 and the connecting hooks 48 are made of the same material as the ring 42, the hooks 48 being formed by curved-over tabs from holes formed in the fastening spigots 44.

In the example described, the electrical connecting element 40 comprises twelve fastening spigots 44, the same number of hooks 48 and four connecting pins 46.

The fastening spigots 44 are embedded in holes 50 of complementary shape formed in a fastening crown 52 made of the same material as an electrical insulation cheek 24.

The connecting pins 46 are embedded in piercings 54 formed through the electronic circuit support plate 34.

The ends of the conductors forming the current entries and exits of the coils of the armature winding 12 are linked to the connecting hooks 48 by welding.

The connecting pins 46 extend into the piercings 54, through the flange 32 and the plate 34, their free ends projecting from the face of this plate opposite the armature winding 12 and being linked to conductors of the electronic circuit 36 by welding.

If necessary, the connecting pins 46 are covered with insulating sleeves preventing any electrical contact between these pins and the flange 32.

The contour of the ring 42 is interrupted in such a way as to delimit an axial gap 56 intended to interact with an axial projection 58 of complementary shape, formed on the crown 52. The gap 56 and the projection 58 form indexing means for the correct angular positioning of the spigots 44 with respect to the armature 16.

The electrical connection element 40 also includes indexing means, by irregular angular spacing of the connecting pins 46 and of the piercings 54, for the correct connection of these pins 46 with the electronic circuit 36.

The indexing means which have just been described thus make it possible to ensure correct relative positioning of the armature 16, of the electrical connecting element 40 and of the electronic circuit support plate 34.

The ring 42 includes thinned regions 60, preferably along its axial direction as represented in the figures, intended for sectioning this ring into different electrically isolated sectors.

When the armature winding 12 is manufactured, the electrical connecting element 40 is inserted into the armature 16, then the coils are wound in the slots 20 with conventional means usually used to manufacture armature windings with a collector and brushes.

After welding the ends of the conductors of the coils onto the connecting hooks 48, the ring 42 is sectioned at various places in such a way as to divide this ring into electrically isolated sectors and to produce the desired coil couplings.

It will be noted, in FIGS. 1 to 3, that the ring 42 is represented in a single piece, before sectioning into different isolated sectors.

The winding of the armature winding 12 will be described below, referring to FIGS. 4 to 9.

The armature winding 12 comprises twenty-four slots 20 and the same number of teeth 21. As previously stated, the armature winding 12 is of the three-phase square type. It includes twelve coils A1 to A4, B1 to B4, C1 to C4 distributed into three phases. The coils of the same phase are supplied with electricity simultaneously. Each phase includes two pairs of diametrally opposed coils. These pairs are arranged at a right angle with respect to one another.

The coils are distributed into, lower and upper, layers, the lower coils A1, A3, C1, C3, B2, B4 alternating with the upper coils B1, B3, A2, A4, C2, C4.

Each phase includes a pair of diametrally opposed coils arranged in the lower layer and a pair of diemetrally opposed coils arranged in the upper layer.

Each coil A1 to A4, B1 to B4, C1 to C4 includes lower A11, B11, C11, A21, B21, C21, A31, B31, C31, A41, B41, C41 and upper A12, B12, C12, A22, B22, C22, A32, B32, C32, A42, B42, C42, windings.

The lower and upper windings of the same coil are shown diagrammatically in FIGS. 4 and 7 to 9 by a single turn.

It will be noted that the coils are wound on the armature 16 in such a way that each one surrounds three teeth 21. A coil of the upper layer is interposed between two coils of the lower layer in such a way as partially to cover these latter two coils. Hence, each coil of the lower layer surrounds one tooth which is common with the coil of the immediately adjacent upper layer.

Figure 5:
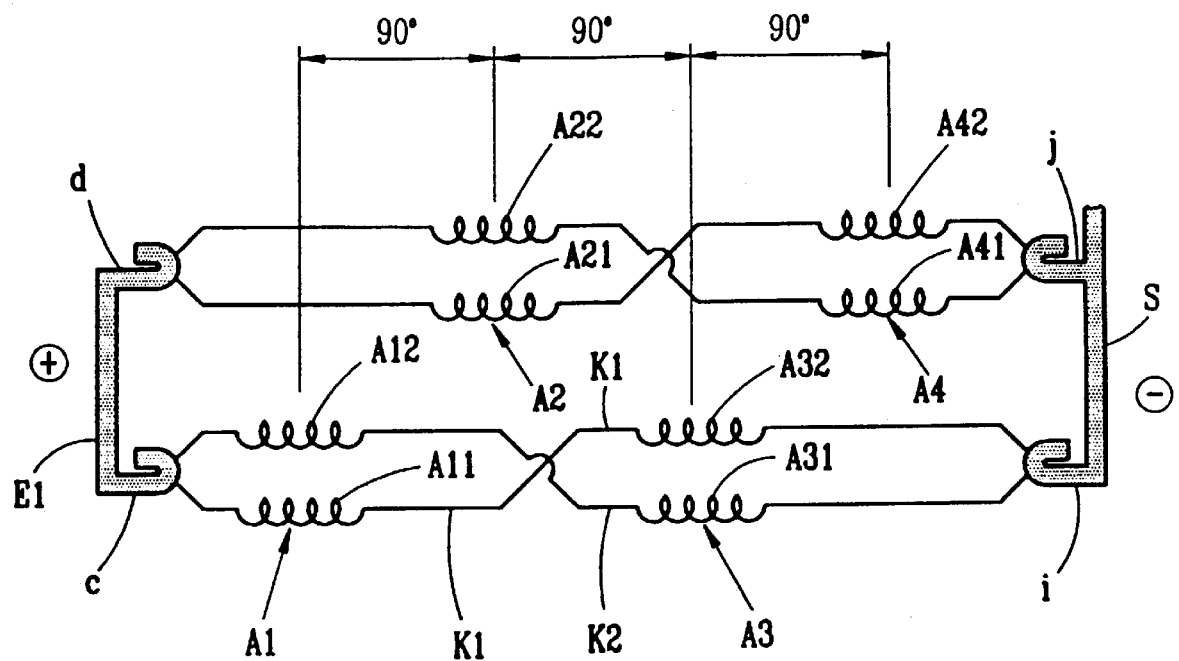
FIG. 5 is a diagram of one phase of the armature winding.

The coils of one phase have been shown diagrammatically in FIG. 5. In this figure, it is seen that each coil includes two uninterrupted wound conductors K1, K2 linked electrically in parallel. Each conductor K1, K2 forms the lower winding A11, A21, A31, A41 of one coil of a pair and the upper winding A32, A42, A12, A22 of this pair, in such a way that these lower and upper windings are linked electrically in series.

Each pair of diametrally opposed coils thus includes one coil A1, A2 for current entry into the pair, and one coil A3, A4 for current exit from the pair.

The configuration of the other phases of the armature winding is similar to the configuration of the phase represented in FIG. 5.

The two diametrally opposed coils are wound by means of a conventional two-armed winder, according to the method which will be described below by referring to FIG. 7. In this figure, only a lower pair of diametrally opposed coils A1, A3 has been represented.

In the course of a first stage, the arms simultaneously produce the two lower windings A11, A31 of the coils, by winding the two corresponding conductors K1, K2 in directions which are symmetric with respect to the diametral plane of the armature 16 perpendicular to the alignment of the coils A1, A2.

With the lower windings completed, the armature 16 is turned by one half-turn about its axis, without altering the position of the arms of the winder.

In a second stage, the arms of the winder simultaneously form the two upper windings A12, A32 of the coils by winding the two corresponding conductors K1, K2 in the same direction as in the course of the first stage.

Figure 7:
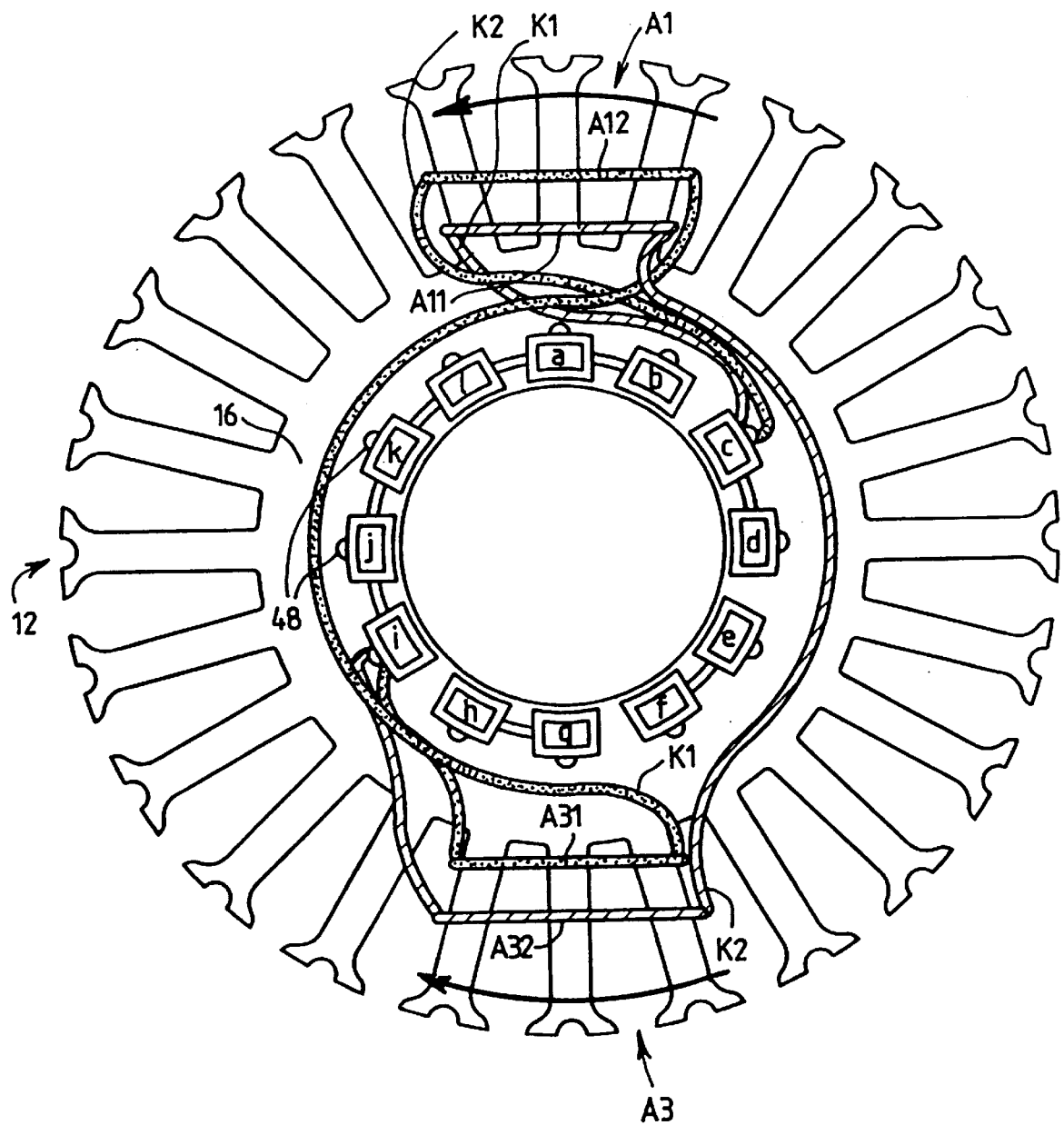
FIGS. 7 to 9 are views similar to FIG. 4 showing various stages in the winding of the armature winding.

The directions of winding of the conductors K1, K2 by the arms of the winder are indicated by arrows in FIG. 7.

The complete winding of the armature winding 12 is produced in the following way.

Figure 8:
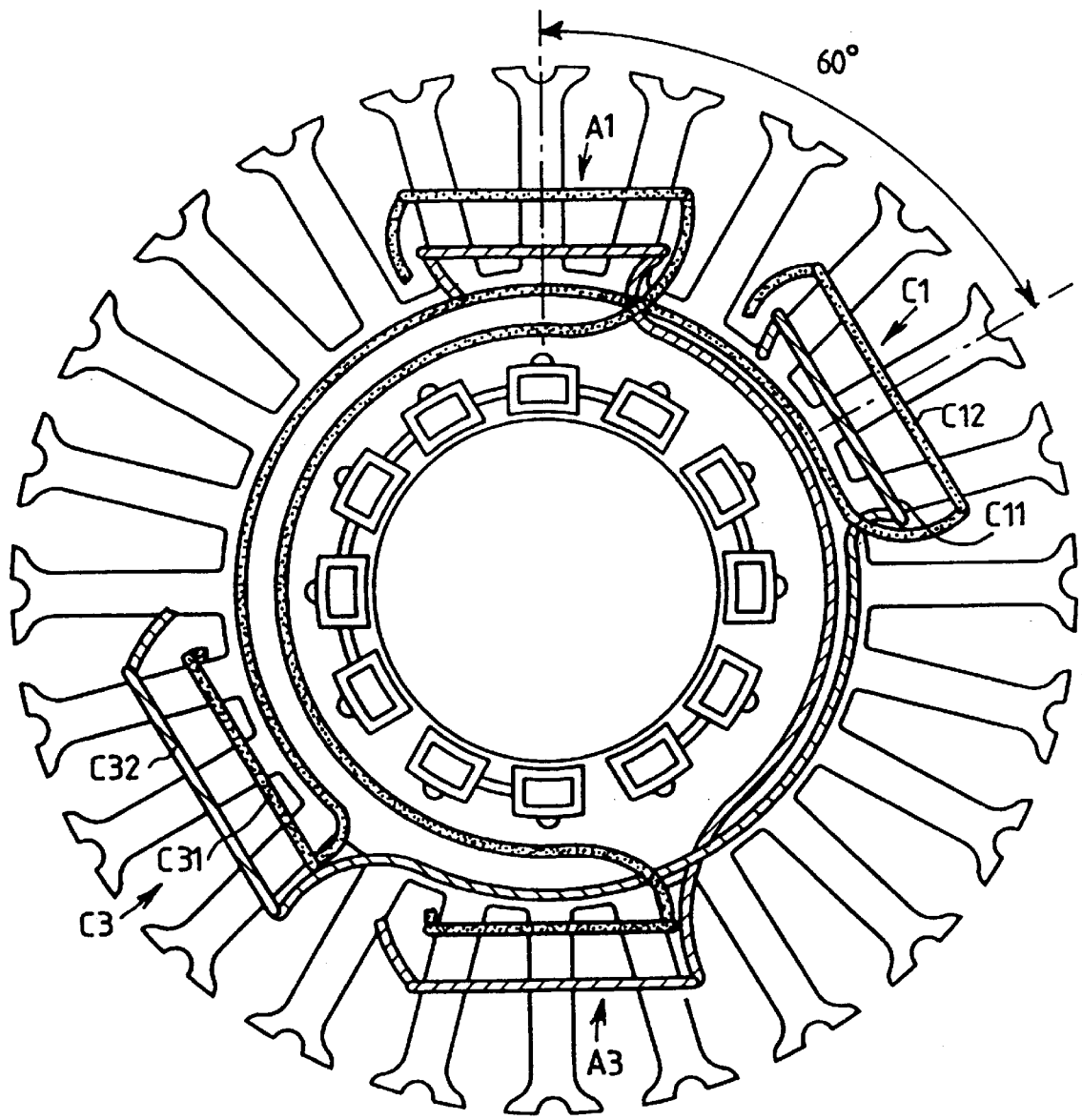
Figure 9:
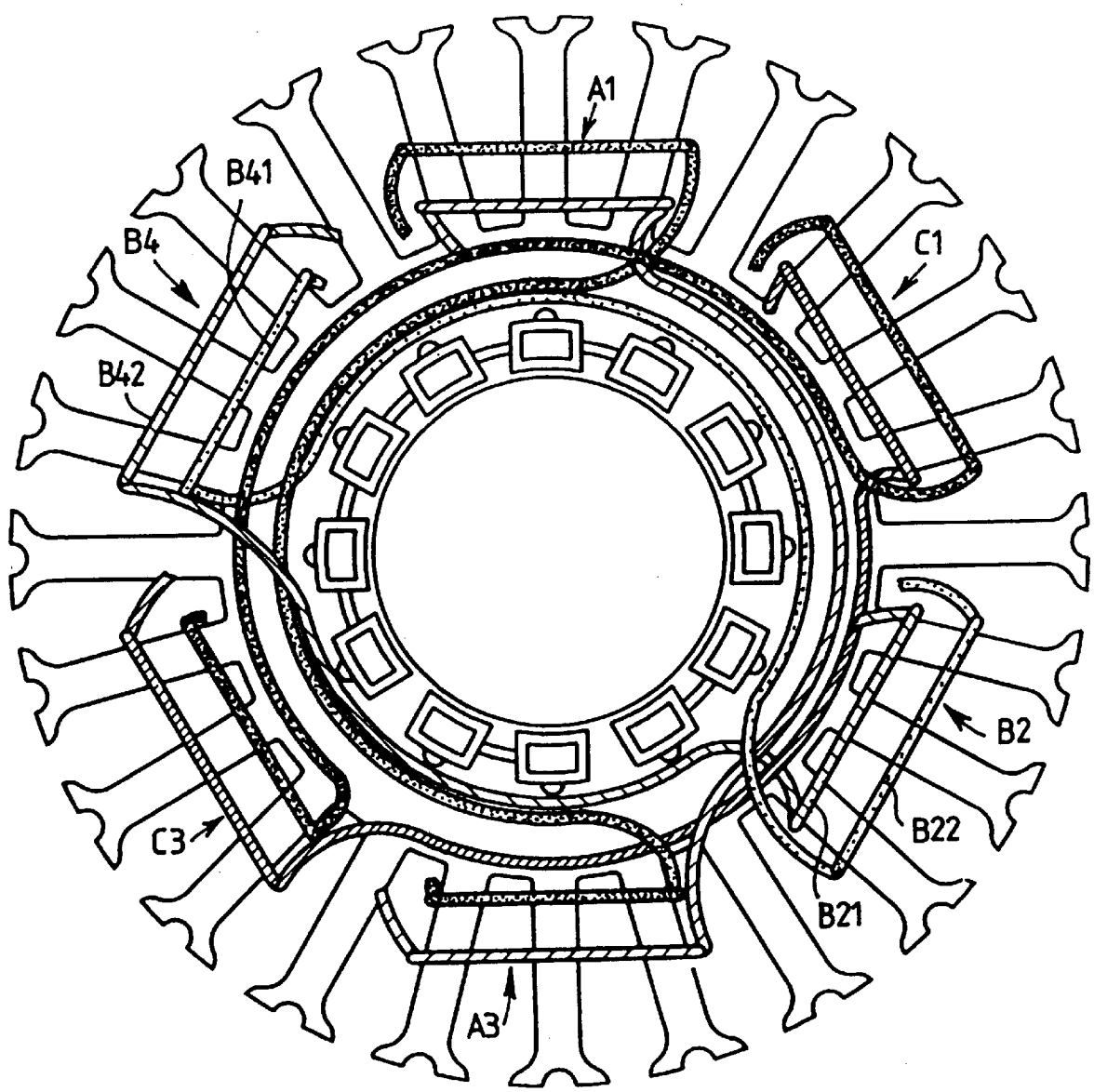

In the first place, all the coils of the lower layer are produced. To do that, the lower pair of coils of a first phase are produced, as described above and illustrated by FIG. 7, then the lower pair of coils of a second phase are produced, this pair being offset by 60° with respect to the preceding one, as illustrated in FIG. 8, and finally the lower pair of coils of the third phase are produced, as illustrated in FIG. 9.

Figure 4:
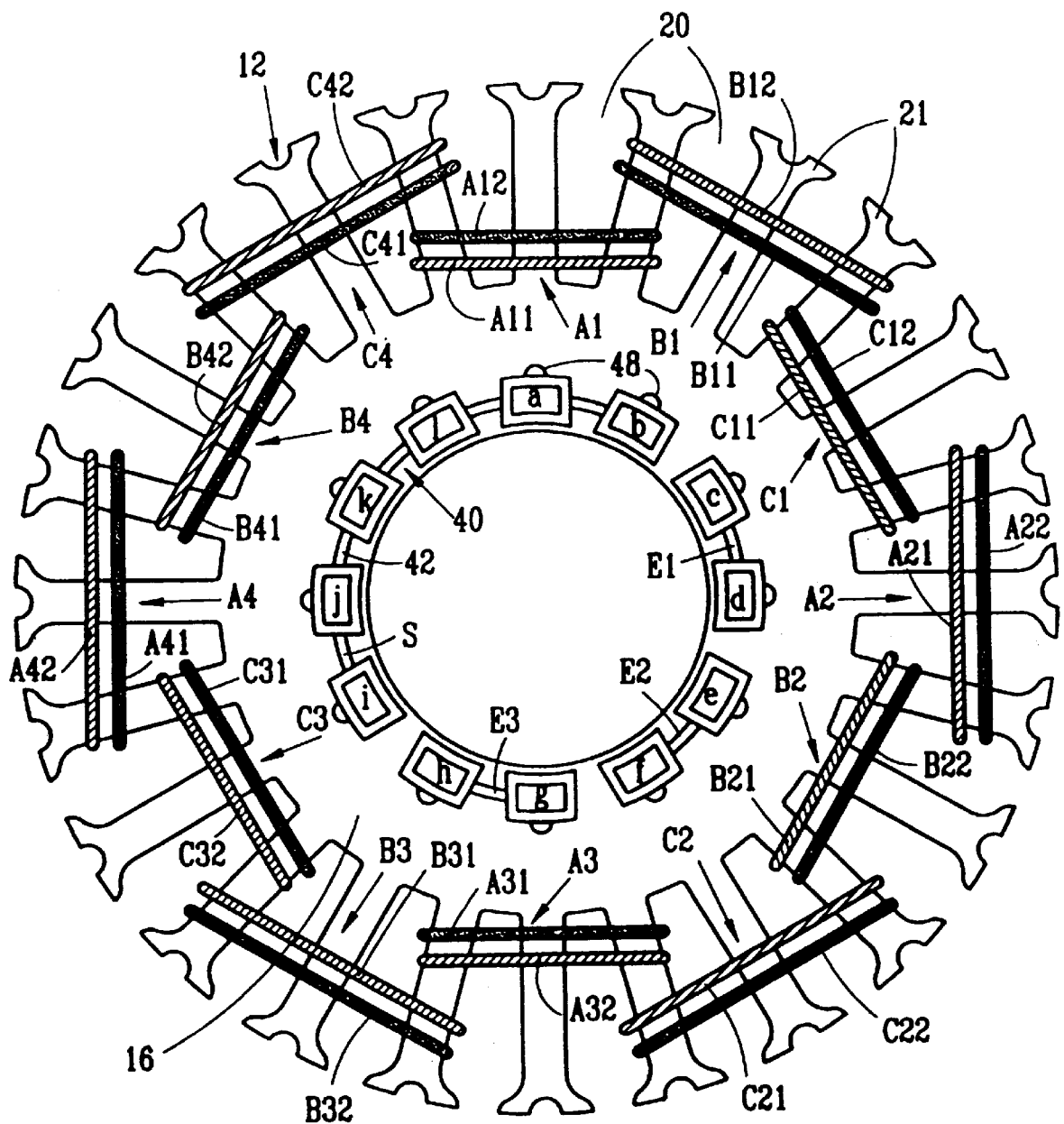
FIG. 4 is a diagrammatic front view of the armature winding of the motor according to the invention.

In the second place, the coils of the upper layer are produced, in a way similar to those of the lower layer, in such a way as to obtain the armature winding represented in FIG. 4.

All the pairs of diametrally opposed coils are produced according to the same previously described method and by means of the same two-armed winder.

The use of a two-armed winder makes it possible to produce the winding of the armature automatically and rapidly.

The motor according to the invention includes the same number of hooks 48 as armature winding coils, namely twelve. These hooks 48 are identified by alphabetical references a to l and are distributed in terms of angle in line with the coils of the armature winding.

It can also be seen in FIG. 4 that the ring 42 is divided into four electrically isolated sectors. The ring 42 includes one current-entry sector E1 to E3 per phase, onto which are linked the ends of the conductors K1, K2 forming the current entries of the two pairs of coils of this phase, and an exit sector S, onto which are linked all the ends of the conductors K1, K2 forming the current exits of all the pairs of coils. Hence, the two pairs of coils of the same phase are linked electrically in parallel.

It will be noted that the ring 42 includes the same number of connecting pins 44 as sectors E1 to E3, S.

Figure 6:
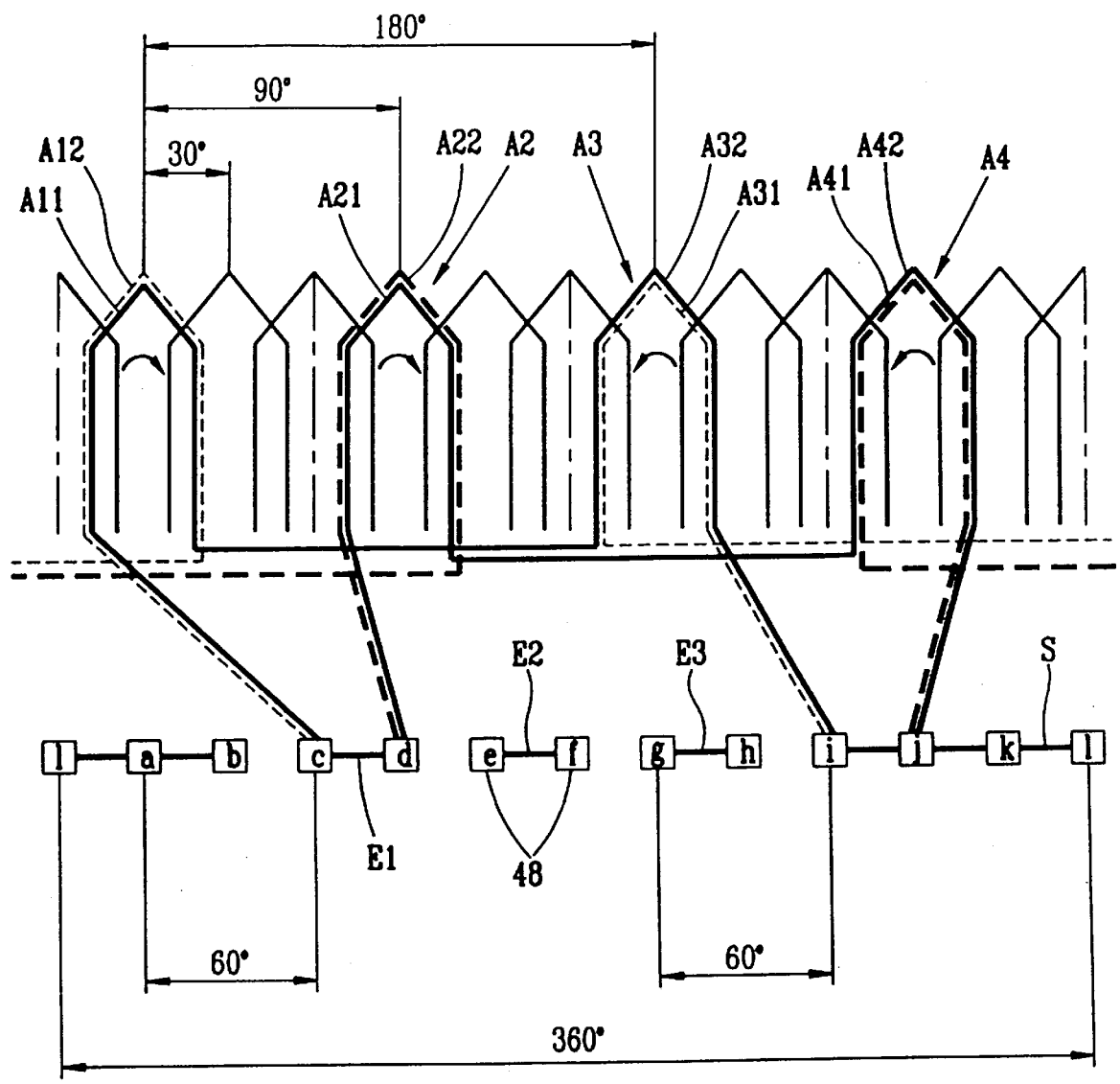
FIG. 6 is a developed diagram of the coils of the armature winding.

Referring now to FIG. 6, the electrical connection of the coils of one phase to the hooks 48 is clearly illustrated.

In this figure, it is seen that the current entry of the lower pair (belonging to the lower layer) of coils A1, A3 of one phase is linked to a current entry hook c offset by 60°, in the clockwise direction, with respect to the current entry coil A1 of this pair. Likewise, the current exit of the lower pair of coils A1, A3 of a phase is linked to a current exit hook i offset by 60°, in the clockwise direction, with respect to the current exit coil A3 of that pait.

In contrast, the current entry of the upper pair (belonging to the upper layer) of coils A2, A4 of one phase is linked to a current entry hook d arranged in line with the current entry coil A2 of this pair. Likewise, the current exit of the upper pair of coils A2, A4 of one phase is linked to a current exit hook j arranged in line with the current exit coil A4 of that pair.

Hence it is arranged, on the one hand, that the two current entry hooks which are linked to the two pairs of coils of the same phase are juxtaposed and belong to the same current entry sector E1 to E3, and, on the other hand, that all the current exit hooks are juxtaposed and belong to the same current exit sector S.

It will be noted that, for reasons of clarity, the connections of all the coils of the armature winding are not represented in FIG. 6. In FIG. 5, the current entry hooks c, d of one phase, corresponding to a positive polarization of the current (+), and the current exit hooks i, j of thin phase, corresponding to a negative polarization of the current (−), have been represented.

The invention is not limited to the embodiment illustrated in the figures.

In particular, the invention can be applied to any direct-current electric motor, the armature winding of which includes conducting coils distributed into three phases and into at least two layers, each phase including at least two pairs of diametrally opposed coils.

The invention features numerous advantages.

In particular, it makes it possible to wind the armature winding rapidly with automatic facilities.

The winding according to the invention of the dianetrally opposed coils makes it possible to reduce the number of coil connection hooks by half with respect to the conventional armature windings including an identical number of coils supplied with electricity by means of brushes and a collector.

Moreover, the various phases of the armature winding of the motor according to the invention are electrically balanced.

What is claimed is:

1. A method of manufacturing a direct-current electric motor including an armature winding (12) with an armature (16) of generally cylindrical shape carrying conducting coils (A1 to A4, B1 to B4, C1 to C4) distributed into three phases and into a lower layer and an upper layer, the lower coils (A1, A3, C1, C3, B2, B4) alternating with the upper coils (B1, B3, A2, A4, C2, C4), each coil including a lower winding (A11, B11, C11, A21, B21, C21, A31, B31, C31, A41, B41, C41) and an upper winding (A12, B12, C12, A22, B22, C22, A32, B32, C32, A42, B42, C42)

each phase comprising
- a first pair of diametrally opposed coils comprising a coil for current entry into the first pair and a coil for current exit from the first pair, the coils of the first pair being arranged in the lower layer,
- a second pair of diametrally opposed coils comprising a coil for current entry into the second pair and a coil for current exit from the second pair, the coils of the second pair being arranged in the upper layer,
- the first and second pairs of coils being parallely connected electrically to each other,
- each pair of coils being formed by first and second uninterrupted conductors (K1, K2) linked electrically in parallel, the first conductor being wound in order to form the lower winding of the current entry coil of the pair and the upper winding of the current exit coil of the pair in such a way that the lower winding of the current entry coil and the upper winding of the current exit coil are linked electrically in series, the second conductor being wound in order to form the upper winding of the current entry coil of the pair and the lower winding of the current exit coil of the pair in such a way that the upper winding of the current entry coil and the lower winding of the current exit coil are linked electrically in series, said method comprising the steps of
- forming each pair of coils comprising the first and second uninterrupted conductors (K1, K2) by
- in a first stage, winding the first and second conductors (K1, K2) in directions which are symmetric with respect to a diametral plane of the armature (16), said plane being perpendicular to an alignment axis of the coils of the pair, in such a way to produce simultaneously the two lower windings of the coils of the pair, and then
- in a second stage, after rotating the armature (16) by half-turn about its axis, winding the first and second conductors (K1, K2) in directions which are symmetric with respect to said diametral plane, in such a way to produce simultaneously the two upper windings of the coils of the pair.

* * * * *